(12) United States Patent
Chauvin et al.

(10) Patent No.: US 6,950,630 B2
(45) Date of Patent: Sep. 27, 2005

(54) HARD DECISION-BASED DECORRELATOR FOR ESTIMATING SPATIAL SIGNATURES IN A WIRELESS COMMUNICATIONS SYSTEM

(75) Inventors: Todd H. Chauvin, Sunnyvale, CA (US); Adam B. Kerr, Menlo Park, CA (US); Athanasios A. Kasapi, San Francisco, CA (US)

(73) Assignee: ArrayComm, Inc., San Jose, CA (US)

( * ) Notice: Subject to any disclaimer, the term of this patent is extended or adjusted under 35 U.S.C. 154(b) by 117 days.

(21) Appl. No.: 10/387,933

(22) Filed: Mar. 13, 2003

(65) Prior Publication Data

US 2004/0180626 A1 Sep. 16, 2004

(51) Int. Cl.$^7$ .............................. H04B 17/00; H04B 1/38
(52) U.S. Cl. ................. 455/67.11; 455/561; 455/562.1; 455/226.1; 375/210
(58) Field of Search ............................. 455/561, 562.1, 455/226.1, 67.11, 511, 67.13; 375/210, 142, 150

(56) References Cited

U.S. PATENT DOCUMENTS 5,317,595 A * 5/1994 Ostman ...................... 375/232
6,668,161 B2 * 12/2003 Boros et al. ............. 455/67.14

* cited by examiner

*Primary Examiner*—Lee Nguyen
*Assistant Examiner*—Eugene Yun
(74) *Attorney, Agent, or Firm*—Blakely, Sokoloff, Taylor & Zafman, LLP

(57) ABSTRACT

Spatial and temporal characteristics of received radio signals in a multiple user radio system can be estimated based on signals received from the users. In one embodiment, the invention includes measuring radio frequency signals received at different elements of an antenna system over time, the received signals corresponding at least in part to transmissions received from a system user, accumulating the signal measurements into a first matrix, generating a second matrix representing the transmissions of the system user, cross-correlating the first and second matrices to form a third matrix, and multiplying the third matrix with a product of the second matrix to form a fourth matrix in which the elements of the fourth matrix characterize the radio channel traversed by transmissions of the system user.

23 Claims, 6 Drawing Sheets

US 6,950,630 B2

HARD DECISION-BASED DECORRELATOR FOR ESTIMATING SPATIAL SIGNATURES IN A WIRELESS COMMUNICATIONS SYSTEM

BACKGROUND OF THE INVENTION

1. Field

The present invention relates to the field of wireless communications systems and, in particular, to determining spatial and temporal characteristics of signals received from transmitting wireless terminals.

2. Description of the Prior Art

Signal processing and a multiple antenna array can be used in a communication station (e.g., a base station) equipped with multiple antennas to either reject interference when receiving (e.g. on the uplink) or to deliver power in a spatially or spatio-temporally selective manner when transmitting (e.g., on the downlink). On the uplink, linear spatial processing can be used to apply amplitude and phase adjustments, typically but not necessarily in baseband, to each of the signals received at the antenna array elements. Such an adaptive smart antenna system can select (i.e., preferentially receive) the signals of interest while minimizing any signals or noise not of interest including interference. Such baseband amplitude and phase adjustment can be described by a complex valued weight, the receive weight, and the receive weights for all elements of the array can be described by a complex valued vector, the receive weight vector.

Similarly, the downlink signal is processed by adjusting the amplitude and phase of the baseband signals that are transmitted by each of the antennas of the antenna array. Such amplitude and phase control can be described by a complex valued weight, the transmit weight, and the weights for all elements of the array by a complex valued vector, the transmit weight vector. In some systems, the receive (and/or transmit) weights include temporal processing, and in such cases, the receive (and/or transmit) weights may be functions of frequency and applied in the frequency domain or, equivalently, functions of time applied as convolution kernels. Alternatively, each convolution kernel, if for sampled signals, may itself be described by a set of complex numbers, so that the vector of convolution kernels may be re-written as a complex values weight vector, which, for the case of there being M antennas and each kernel having K entries, would be a vector of KM entries.

System performance and the determination of weight vectors can be improved using knowledge of all remote user and interferer spatial signatures (or spatio-temporal signatures). The receive spatial signature and the receive spatio-temporal signature characterizes how the receiving array receives signals from a particular subscriber unit in the absence of any interference or other subscriber units. The transmit spatial signature and the transmit spatio-temporal signature of a particular remote user characterizes how the remote user receives signals from the transmitting station in the absence of any interference.

Spatial signatures can also be used to track the channels and movements of users and to track relative movement between users. The relative movement can be used as a measure of how close two users have come to each other. This information can be used for resource allocation decisions. For example, if two co-channel users come so close together that their signals are difficult to resolve, then one of the users can be handed off to a different frequency.

An estimate of a spatial signature can be obtained from the correlation of the received signal from a particular user with the actual signal transmitted by the user. The actual transmitted signal can be determined using a known sequence, such as a training sequence or by estimating the signal. If only a training sequence is known, then the rest of the signal can be estimated based on the training sequence portion. A spatial signature determined from a simple correlation can be biased by interference from other users, noise and multipath effects. When two users are nearby and transmitting at about the same power it may not be possible to distinguish the two. When a high power user is transmitting near a low power user, it may not be possible to distinguish the low power user at all.

BRIEF SUMMARY OF THE INVENTION

Spatial and temporal characteristics of received radio signals in a multiple user radio system can be estimated based on signals received from the users. In one embodiment, the invention includes measuring radio frequency signals received at different elements of an antenna system over time, the received signals corresponding at least in part to transmissions received from a system user, accumulating the signal measurements into a first matrix, generating a second matrix representing the transmissions of the system user, cross-correlating the first and second matrices to form a third matrix, and multiplying the third matrix with a product of the second matrix to form a fourth matrix in which the elements of the fourth matrix characterize the radio channel traversed by transmissions of the system user.

BRIEF DESCRIPTION OF THE DRAWINGS

The present invention is illustrated by way of example, and not by way of limitation, in the Figures of the accompanying drawings in which like reference numerals refer to similar elements and in which.

DETAILED DESCRIPTION OF THE INVENTION

Overview

Figure 1:
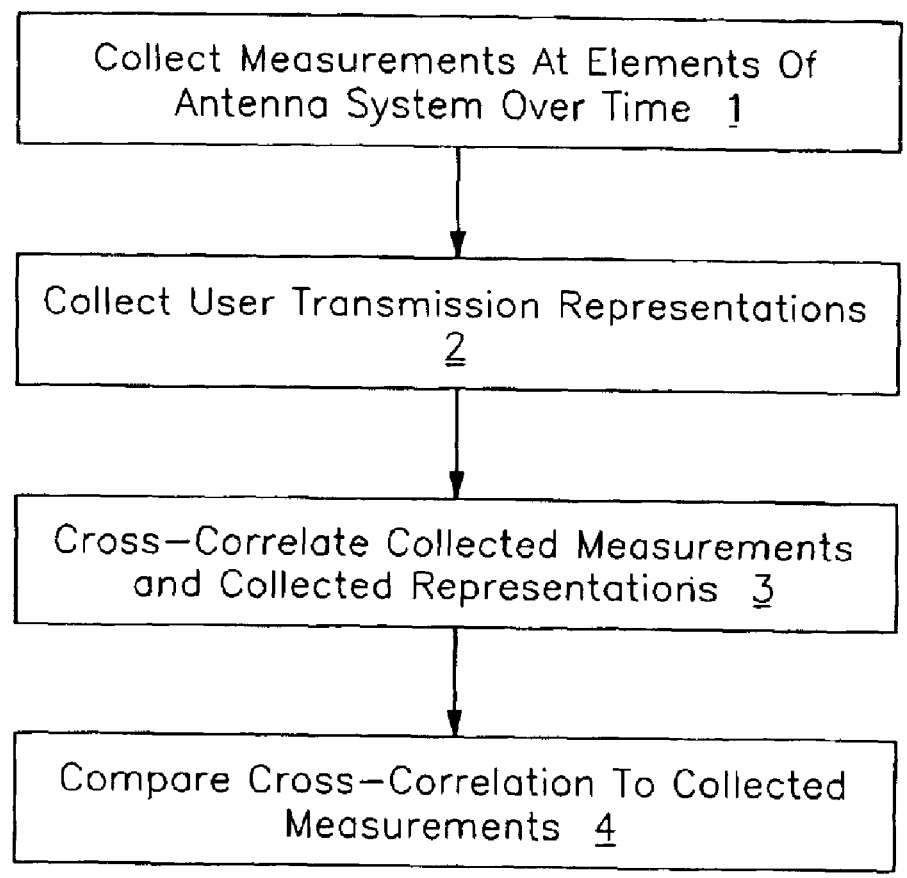
FIG. 1 is a flow chart of an example of determining an estimate of a spatial signature.

An unbiased spatial signature can be estimated by isolating the contribution of the user of interest from all of the other users. This can be done by collecting an estimate of the spatial signature for each user into columns of a matrix R, generated, for example, by cross-correlating the composite received signal with each user's corresponding estimated transmitted signal, and decorrelating with a matrix consisting of information from all of the users represented in the matrix R. As explained below, this can be expressed, in one example using hard symbol decisions, as $\hat{A}=R(SS^H)^{-1}$ or using soft symbol decisions as $\hat{A}=(R_{zz}R)(RR^H)^{-1}$.

Adaptive Smart Antenna Processing

Embodiments of the invention relate to estimating spatial signatures used by a communications station to characterize communicating terminals. In some embodiments, the communications station is a base station communicating with many user terminals or remote terminals The spatial signatures can be used to define a transmitted signal or to process a received signal. It can also be used in order to deepen or otherwise manipulate the depth of a null formed to mitigate the effects of one or more known interferers. The interferer may or may not be another remote user sharing the same communication channel with the same base station. The estimations can be implemented in a communication station that includes a receiver, a transmitter, an array of antennas and an adaptive smart antenna processor.

In smart antenna and spatial diversity systems, the signals from a subscriber (remote) unit are received by each of the antenna array elements and combined by the adaptive smart antenna processing elements to provide an estimate of the signal received from that subscriber unit. The smart antenna processing can be linear spatial processing, in which each of the complex-valued (i.e., including in-phase I and quadrature Q components) signals received from each antenna element is weighted in amplitude and phase by a weighting factor and the weighted signals are then summed to provide the signal estimate. The adaptive smart antenna processing scheme (e.g., the strategy or spatial strategy) can then be described by a set of complex valued weights, one for each of the antenna elements. These complex valued weights can be described as a single complex valued vector of M elements, where M is the number of antenna elements. In a linear case, the smart antenna processing is designed to determine a set of weights in which the sum of the products of the weights times the antenna element signals provides an estimate of the remote user's transmitted signal.

This type of adaptive smart antenna processing can be extended to include spatio-temporal processing in which the signal at each antenna element, rather than being weighted in amplitude and phase, is filtered by a complex valued filter, typically for purposes of time equalization. In such a method, each filter can be described by a complex-valued transfer function or convolving function. The adaptive smart antenna processing of all elements can then be described by a complex valued M-vector of M complex valued convolving functions.

Weight determining schemes can also use training data, i.e. data whose symbols are known a priori. The training data (possibly with a timing offset or frequency offset, or both applied) is then used as a reference signal to determine the smart antenna processing strategy (e.g., the weights). Therefore, reference signal based methods can include the case in which the reference signal includes training data, the case in which the reference signal includes a signal constrained to have some property of the transmitted signal, and the case in which the reference signal includes constructing a signal based on making symbol decisions.

Adaptive smart antenna processing can permit more than one communication link to exist in a single "conventional" communication channel so long as the subscriber units that share the conventional channel can be spatially (or spatio-temporally) resolved. A conventional channel can be a frequency channel in a frequency division multiple access (FDMA) system, a time slot in a time division multiple access (TDMA) system (which usually also includes FDMA, so the conventional channel is a time and frequency slot), and a code in a code division multiple access (CDMA) system. Adaptive smart antenna processing can also be used to enhance performance in CDMA when codes are not shared. The conventional channel when it carries more than one communications link can be described as divided into one or more "spatial" channels. A system with more than one spatial channel per conventional channel can be called spatial division multiple access (SDMA). SDMA is used herein to include the possibility of adaptive smart antenna processing, both with one and with more than one spatial channel per conventional channel. SDMA may or may not use adaptive processing or smart antenna processing.

Note that because a signature may be a spatial signature or a spatio-temporal signature, depending on whether the smart antenna processing is spatial or spatio-temporal, the term signature will be used herein, and whether the signature is spatial or spatio-temporal will depend on whether the processing is spatial or spatio-temporal, and whether the signature is a transmit or a receive signature will depend on the context, and which signature will be clear to those of ordinary skill in the art from the context.

The matrix Z, in the present description, can be described as follows. Given M antenna elements (M may be 4, 5, 12 or another value, depending on the antenna configuration), let $z_1(t), z_2(t), \ldots, z_M(t)$ be the complex valued responses (that is, with in-phase (I) and quadrature (Q) components) of the first, second, . . . , M'th antenna elements, respectively, after down-conversion, that is, in baseband, and after sampling (e.g. four-times oversampling). In the above notation, but not necessarily required for the present invention, t is discrete. These M time-sampled quantities can be represented by a single M-vector z(t) with the i'th row of z(t) being $z_1(t)$. For each burst, a finite number of samples, say N, is collected, so that $z_1(t), z_2(t), \ldots, z_M(t)$ can each be represented as a N-row vector and z(t) can be represented by a M by N matrix Z.

The matrix S, in the present description, is described as follows. Assume signals are transmitted to the base station from $N_S$ remote users all operating on the same (conventional) channel. In particular, assume that one of these, a particular subscriber unit of interest, transmits a signal s(t). Linear adaptive smart antenna processing, which is used in the preferred embodiment of the invention, includes taking a particular combination of the I values and the Q values of the received antenna element signals $z_1(t), z_2(t), \ldots, z_M(t)$ in order to extract an estimate of the transmitted signal s(t). Such complex valued weights may be represented by the receive weight vector for this particular subscriber unit, denoted by a complex valued weight vector $w_r$, with $i^{th}$ element $w_{ri}$. The estimate of the transmitted signal from the remote unit may then be represented as:

$$s(t) = \sum_{i=1}^{M} w'_{ri} z_i(t) = w_r^H z(t) \quad \text{(Eq. 1)}$$

where $w'_{ri}$ is the complex conjugate of $w_{ri}$ and $w_r^H$ is the Hermitian transpose (that is, the transpose and complex conjugate) of receive weight vector $w_r$. Equation 1 is called a copy signal operation, and the signal estimate s(t) thus obtained can be called a copy signal. Other processing can be done on this copy signal to reduce noise, such as filter or constellation projection. For each burst, a finite number of samples, say N, is collected, making s(t) a 1 by N vector. The matrix S would then be a $N_S$ by N collection of the copy signal for the $N_S$ users.

The spatial processing described by Equation 1 may be re-written in vector form for the case of N samples of M-vector signals z(t) and N samples of the transmitted signal s(t) being estimated. In such a case, let s be a (1 by N) row vector of the N samples of s(t). The copy signal operation of Equation 1 may then be re-written as $s=w_r^H Z$.

In embodiments which include spatio-temporal processing, each element in the receive weight vector is a function of time, so that the weight vector may be denoted as $w_r(t)$, with ith element $w_{ri}(t)$. The estimate of the signal may then be expressed as:

$$s(t) = \sum_{i=1}^{M} w_{ri}(t) * z_i(t) \qquad \text{(Eq. 2)}$$

where the operator "*" represents the convolution operation. Spatio-temporal processing may combine time equalization with spatial processing, and is particularly useful for wideband signals. Forming the estimate of the signal using spatio-temporal processing may equivalently be carried out in the frequency (Fourier transform) domain. Denoting the frequency domain representations of s(t), $z_i(t)$, and $w_{ri}(t)$ by s (k), $z_i(k)$, and w (k), respectively, where k is the discrete frequency value:

$$s(k) = \sum_{i=1}^{M} w'_{ri}(k) z_i(k) \qquad \text{(Eq. 3)}$$

With spatio temporal processing, the convolution operation of Equation 2 is usually finite and when performed on sampled data, equivalent to combining the spatial processing with time equalization using a time-domain equalizer with a finite number of equalizer taps. That is, each of the $w_{ri}(t)$ has a finite number of values of t and equivalently, in the frequency domain, each of the $w_{ri}(k)$ has a finite number of k values. If the length of the convolving functions $w_{ri}(t)$ is K, then rather than determining a complex valued M-weight vector $w_r$, one determines a complex valued M by K matrix $W_r$ whose columns are the K values of $w_r(t)$ Alternatively, a spatial weight determining method can be modified for spatio-temporal processing according to a weight matrix by re-expressing the problem in terms of matrices and vectors of different sizes. As throughout this description, let M be the number of antenna elements, and N be the number of samples. Let K be the number of time equalizer taps per antenna element. Each row vector of N samples of the (M by N) received signal matrix Z can be rewritten as K rows of shifted versions of the first row to produce a received signal matrix Z of size (MK by N), which when pre-multiplied by the Hermitian transpose of a weight vector of size (MK by 1), produces an estimated received signal row vector of N samples. The spatio-temporal problem can thus be re-expressed as a weight vector determining problem.

For example, for covariance based methods, the weight vector is a "long" weight vector of size (MK by 1), the covariance matrix $R_{zz}=ZZ^H$ is a matrix of size (MK by MK), and the correlation of the antenna signals Z with the estimated signal s, represented by a (1 by N) row vector, is $R_{zs}=Zs^H$, a long vector of size (MK by 1). Rearranging terms in the "long" weight vector provides the required (M by K) weight matrix.

Determinative Signature Estimation

Spatial signatures can be estimated in a variety of different determinative ways. For one example, consider two subscriber units, denoted $SU_i$ and $SU_j$, respectively. When communicating with $SU_i$, for example, $SU_j$ is an interferer. When the received signals are sampled, say with N samples, the base station computes the weight for the ith remote user. Many methods are possible for the weight computation. For example, the weight to use for the ith remote may be determined by $$w_i \text{argmin}_w \|w^H Z - s_i\|^2 = (R_{zz})^{-1} r_{zs} = (ZZ^H)^{-1} Z s_i^H, \qquad \text{(Eq. 4)}$$

or alternatively, by $$w_i = (ZZ^H + \gamma I)^{-1} Z s_i^H, \qquad \text{(Eq. 5)}$$

where $s_i$ is an estimate of the reference signal for the ith transmitted signal, and i=1, 2, . . . , Ns, the number of co-channel users. $\gamma$ is a small adjustable factor used to improve the performance of the least squares solution by reducing sensitivity to statistical fluctuations in Z. Note that the quantity $R_{zsi}=Zs_i^H$ can be computed at the base station for each remote user i in order to form weights to determine each of the signal estimates $s_i$. As a result, under the assumption of white noise and when there is only a single subscriber unit, the signature of the ith remote user can be estimated as a maximum-likelihood estimate (MLE) by:

$$\hat{a}_i = Zs_i^H (s_i s_i^H)^{-1} \qquad \text{(Eq. 6)}$$

where $s_i$ is the reference signal for the ith remote user. The $(s_i s_i^H)^{-1}$ term is a scalar factor used for normalizing the signature.

Let $\hat{A}$ be a matrix having the Ns signature values as columns. That is, $\hat{A}=[\hat{a}_1 \; \hat{a}_2 \; \ldots \; \hat{a}_{Ns}]$. Then the normal expression for Z can be rewritten in matrix form:

$$Z = \hat{a}_i s_i + \sum_{j \neq i} \hat{a}_j s_j + V = \hat{A}S + V \qquad \text{(Eq. 7)}$$

where matrix $V=[v(1) \; v(2) \ldots v(N)]$ and v is the interference (other than user j) and noise.

When other remote users share the same channel, the spatial signature estimate of Equation 6 is contaminated by cross correlations between signatures. This may be seen by inserting the model of Equation 7 with Equation 6 to obtain $$\hat{a}_i = a_i + \sum_{j \neq i} a_j s_j s_i^H + V s_i^H \qquad \text{(Eq. 8)}$$

The second term of Equation 8 can be approximated as zero in the spatial signature estimation method described by Equation 6. However, this assumption is inaccurate for short data sequences as encountered in practical systems, such as in wireless local loop (WLL) system base stations and mobile PHS base stations.

Another method for signature estimation takes these cross-correlation terms into account. This method is shown generally in FIG. 1. In block 1, measurements of radio frequency signals received at different elements of an antenna system are collected over time. The received signals correspond at least in part to transmissions received from one or more system users and may also include noise from a great many different sources. This can be characterized as the matrix Z, described above, or in any of a number of other ways. In block 2, representations of the transmissions of the one or more system users are collected 2. This can be characterized as the matrix S described above. The representations may be estimates based on received signals, or known sequences. Blocks 2 and 3 need not be performed in any particular order.

In block 3, the collected measurements and the collected representations are cross-correlated. As described above, cross correlating Z and S give $R_{zs}$. $R_{zs}$ is one way to represent such a cross-correlation but other cross-correlations can be used. From this cross-correlation, the radio channel of the transmitting system user or users can be characterized. In block 4, the cross-correlation is compared to the collected measurements to form such a characterization. In one example, this characterization is an estimate of the spatial signature â of the user. If the process is formed for multiple users using the matrices described above, then the result can be expressed as the matrix Â. The particular nature of this comparison is described in more detail in the examples below. In any implementation, the operations can be performed as multi-dimensional matrix operations, or as one dimensional vector operations. Similarly, the channel characterizations can be made one user at a time or for several users simultaneously. The particular implementation choice will depend on the particular application and the equipment to be employed.

Signature Estimation Using Hard Symbol Decision Decorrelator

Figure 2:
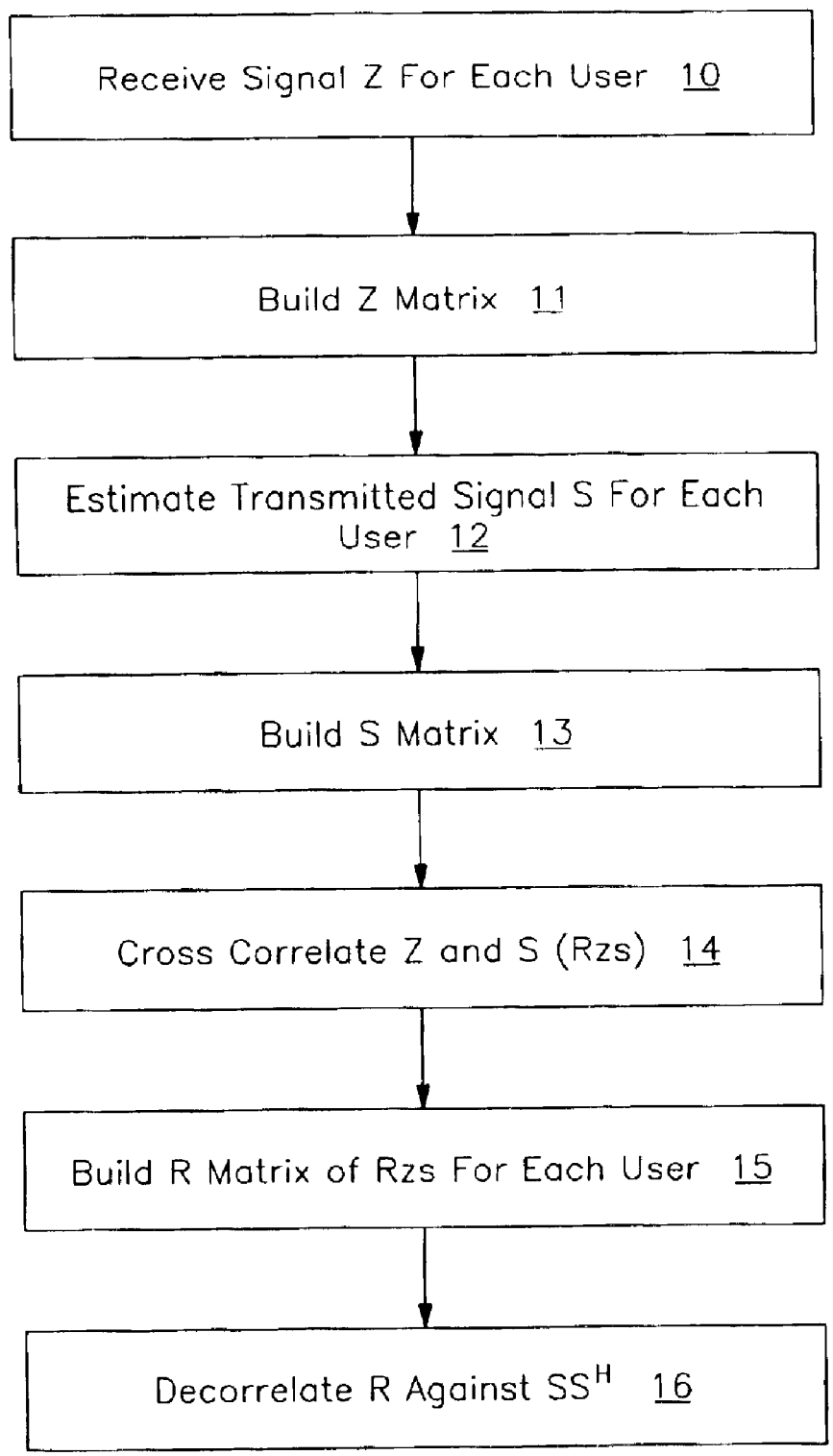
FIG. 2 is a flow chart of an example of determining an estimate of a spatial signature using a correlation with hard symbol decisions.

Referring to FIG. 2, a process for estimating a spatial or spatio-temporal signature is shown that uses many of the concepts and values described above. The process can be applied to a wide variety of different wireless communication systems to isolate the characteristics of one user from other interfering users including other co-channel users in an SDMA system.

In block 10, signals are received from all of the different users. The signals z will each have a component $z_1$, $z_2$, $z_3$, ... $z_M$, at each of M receiving elements of the receiving antenna array. Greater accuracy can be obtained if all of the receive element signals are used, however, the processing can be simplified if only a portion (e.g. 2 or 4) of the antenna element signals are used. These signals can be used to build a 1 by M vector for each user, and, in block 11, the signals for each user can be used to build an n by M matrix Z that includes all of the n users. If there is only one user in the system, the signals z will correspond to just the single user and any noise and interference that may be present.

In block 12, from the received signals or from a known sequence, if the received signals z correspond to a known sequence, the transmitted signals s can be estimated or determined. The known sequence can be a training sequence or any other sequence. Alternatively, the sequences can be estimated using any of variety of different approaches. In one embodiment, the signals can be mapped to the nearest constellation point by phase tracking the signal 50% and normalizing the amplitude of each symbol to remove spurious noise. In another embodiment, the transmitted signal s is determined directly from z and a receive weight vector, s=wz.

The transmitted signals of each user also constitute a one dimensional vector with a complex term for each of the M antenna elements, $s_i$, $s_2$, $s_3$, ... $s_M$. In block 13, this vector can be built into an n by M matrix S for all of the n users. In block 14, using Z and S, the cross correlation matrix $R_{zs}$ can be built as described in more detail above. In block 15, this cross correlation can be used to build the matrix R for each user. The matrix R, in one example, can be columns made up of the $R_{zs}$'s of each detected user, making it a M by $N_S$ matrix. To obtain the spatial signature estimate matrix A, a linear operation is performed on the $R_{zs}$ matrix, R, which produces an unbiased and more accurate estimate of the spatial signatures, A. This linear operation uses only the signals S that are already determined or estimated. One such linear operation, in block 16, is the decorrelation of R against $SS^H$. The operation can be expressed simply as:

$$\hat{A} = R(S\ S^H)^{-1} \qquad \text{(Eq.9)}$$

where Â is a matrix having the signature estimates as columns, $\hat{A} = [\hat{a}_1\ \hat{a}_2\ \ldots\ \hat{a}_{N_s}]$.

Equation 9 follows from rewriting Equation 7, above as $$Z = \hat{A}S + V \qquad \text{(Eq. 10a)}$$

Solving for the matrix A gives:

$$\hat{A}S^H = \hat{A}SS^H + VS^H \qquad \text{(Eq. 10b)}$$

$$\text{and } \hat{A} = (ZS^H - VS^H)(S\ S^H)^{-1} \qquad \text{(Eq. 10c)}$$

Note that $ZS^H$ is the matrix R described above. In addition, since V is a collection of interference from undetected users and noise, it should not be correlated with S. Averaged over time, the term $VS^H$ should be very small and can be ignored. Considering these factors leads directly to Equation 9, above. For higher accuracy demands or for particular noise scenarios, however, Equation 9 can be modified to include $VS^H$.

Equation 9 can be looked at in another way. Taking the noise to be additive white and Gaussian, the MLE solution to Equation 7 is $$\hat{A} = \arg\min Z - \hat{A}S^2 - ZS^H(SS^H)^{-1} \qquad \text{(Eq. 11)}$$

Note that $ZS^H$ is a matrix whose columns are individual user $R_{zs}$'s, making it an M by Ns matrix, described above as R. So performing a linear operation on the signature estimates R gives a better signature estimate Â without any cross-correlation between detected users. This can also be referred to as decorrelating the Ns detected users.

The determination of spatial signatures using Equation 11 isolates each co-channel user from any other. In addition, while there are several calculations to be made to determine the matrices used in the estimation, in an SDMA system, all of these matrices may already be determined to support other processes. The matrices Z and S are determined by the receiver in order to demodulate the received signal. $R_{zs}$ follows immediately and may already be determined in order to establish weight vectors. R follows directly from $R_{zs}$.

Signature Estimation using Soft Symbol Decision Decorrelator

Figure 3:
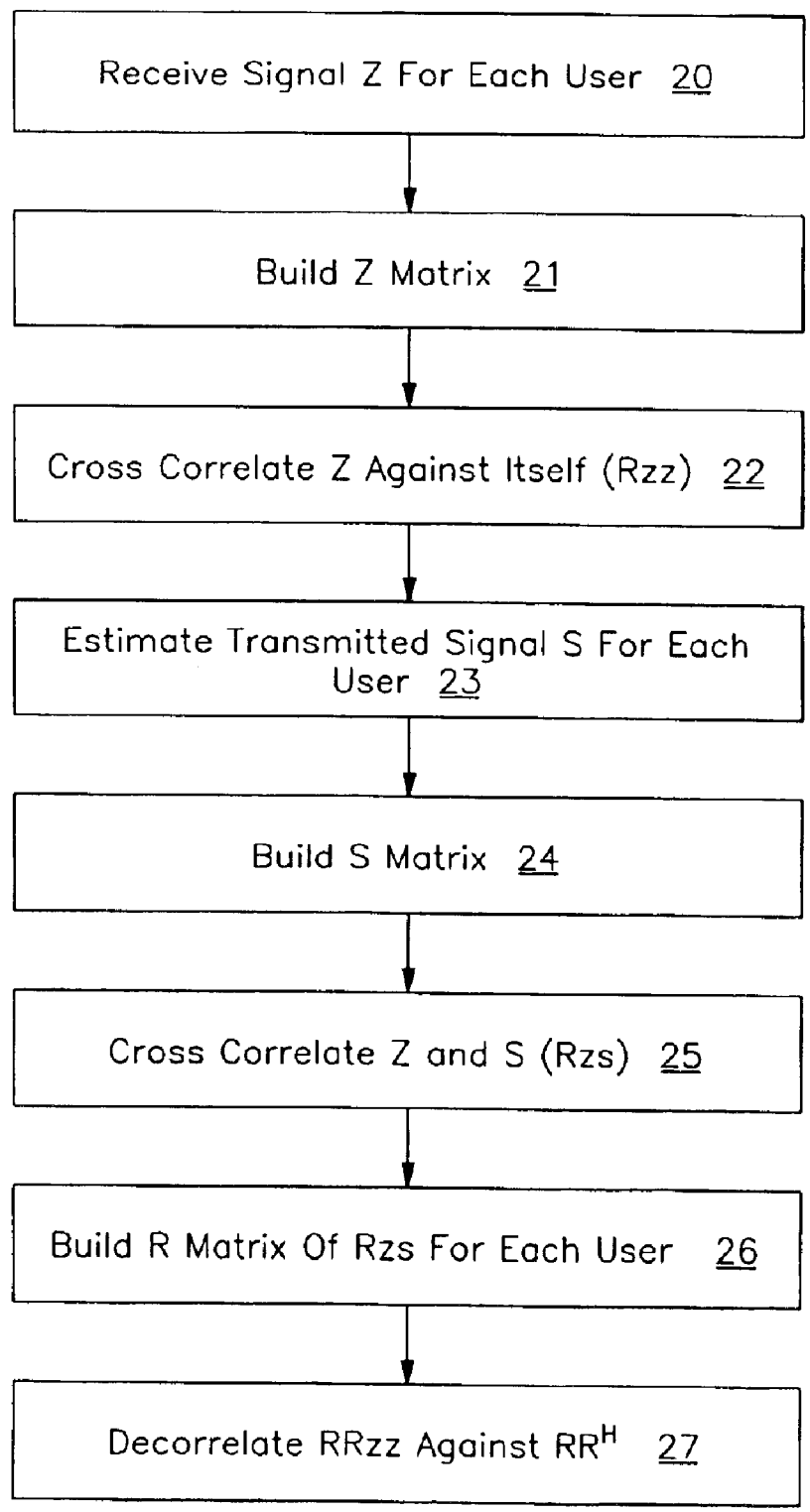
FIG. 3 is a flow chart of an example of determining an estimate of a spatial signature using a correlation with soft symbol decisions.

FIG. 3 shows an alternative process flow that does not require a hard decision for the values of the transmitted signal, i.e. the estimated signal s. As with the process of FIG. 2, the soft decorrelator process starts, in block 20, with the received signal z for each element of the receiving antenna array. From these signals, in block 21, the Z matrix can be built. $R_{zz}$ can then be obtained in block 22, by cross correlating Z against itself ($R_{zz}$).

In block 23, the transmitted signal s for each user is estimated in any of a number of different ways including those discussed above and, in block 24, the S matrix is built. From S and Z, a cross correlation can be done, in block 25, to get $R_{zs}$. From $R_{zs}$, in block 26, a matrix R can be built for each user.

In another embodiment $R_{zz}$ has already been determined as described above for the determination of weight vectors. The $R_{zz}$ values are simply pulled from the appropriate storage register. Accordingly $R_{zs}$ can be obtained simply from the applied weight vector $w_r$ and the received signal s.

To find an estimate of the spatial signature, in block 27, a linear operation is performed on the $R_{zs}$ vector, which produces an unbiased and more accurate estimate of the spatial signatures. One such linear operation uses only the $R_{zs}$'s and the antenna covariance matrix $R_{zz}$. It is performed by decorrelating $RR_{zz}$ against $RR^H$. The operation can be expressed as:

$$A = R_{zz} R(R^H R)^{-1} \quad (Eq. 12)$$

This linear operation follows directly from Equation. 7, above, which can be expressed as $$Z = AS + V \quad (Eq. 13a)$$

multiplying through by $Z^H$ gives $$ZZ^H = R_{zz} = (AS+V)Z^H = AR^H + VZ^H \quad (Eq. 13b)$$

then solving for A gives:

$$(R_{zz} - VZ^H)R = AR^H R \quad (Eq. 13c)$$

$$A = (R_{zz} - VZ^H)R(R^H R)^{-1} \quad (Eq. 13d)$$

V is a collection of interference from undetected users and noise, it should not be correlated with Z. Averaged over time, the term $VZ^H$ may be very small and can be ignored. Ignoring $VZ^H$ leads directly from Equation 13d to Equation 12, above. For higher accuracy demands or for particular noise scenarios, however, Equation 12 can be modified to include $VZ^H$ as suggested in Equation 13d.

Looked at another way, in the absence of noise or additional interferers, $R_{zz}$ can be expressed as the outer product of each user's true signature with its estimated signature. This follows from Equation 7 by multiplication by $Z^H$. In other words:

$$R_{zz} = \hat{A} R^H \quad (Eq. 14)$$

Even with noise present, taking the noise to be additive white and Gaussian, the MLE solution to Eq (14) is $$\hat{A} = \arg\min \| R_{zz} - \hat{A} R^H \|^2 = R_{zz} R(R^H R)^{-1} \quad (Eq. 15)$$

where $\hat{A}$ is a matrix having the signature estimates as columns, $\hat{A} = [\hat{a}_1 \, \hat{a}_2 \, \ldots \, \hat{a}_{N_s}]$.

So a signature estimate with performance that may be similar to that of the hard decorrelator can be achieved by performing two linear operations on the signature estimates R. These operations still have the effect of decorrelating the Ns detected users as can be seen from the results. The soft decorrelator described with reference to FIG. 3 uses less complex linear operations as compared to the hard decorrelator described with reference to FIG. 2.

In both approaches, S can have a large number of terms collected over time. The number of terms will depend on the number of terms selected but S, an n by T, matrix, where T corresponds to the number of samples for each user could have as many as 100 or more columns in a typical system. As a result determining $SS^H$ for the hard decorrelator can require many cycles. R on the other hand is an n by M matrix and in a typical simple system there may be 2 users n, and 4 antenna elements M. Determining $RR^H$ for the soft decorrelator can be much quicker.

In addition, the exact values for S are not necessary in the soft decorrelator. Great accuracy can be obtained by using only an approximation of S. Because S is only reflected in the matrix R which appear on both sides of the correlation, errors in S tend to cancel out.

Extension to Spatio-Temporal Channels

Both the hard and soft decorrelator can be applied to more general spatio-temporal channels. In essence, signals from the same user received at different times, due e.g. to multipath or a transmit antenna array can each be treated as a separate user using exactly the same process discussed above. The signals can then be consolidated or a unique signature can be derived for each separate channel on which the signal arrived. These channels model the transmitted signal as having been convolved with l spatial signatures, each at a different time delay. So, the received signal $$Z = \sum_{l=1}^{L} \hat{A}_l S_{\tau l} \quad (Eq. 12)$$

where each of the signatures $\hat{A}_l$ is a collection of spatial signatures and each of the $S_\tau$ is the "vector" of modulated symbols, delayed by $\tau l$ symbol periods. The decorrelator for this channel follows from expressing the spatio-temporal channel in terms of the M by nl matrix $\hat{A}$, the nl by T matrix S, and the M by nl matrix R. Then, the hard- and soft-decorrelator can be derived using the same approach as for the simple spatial channel using the larger number of terms present from the additional temporal terms.

Base Station Architecture

Figure 4:
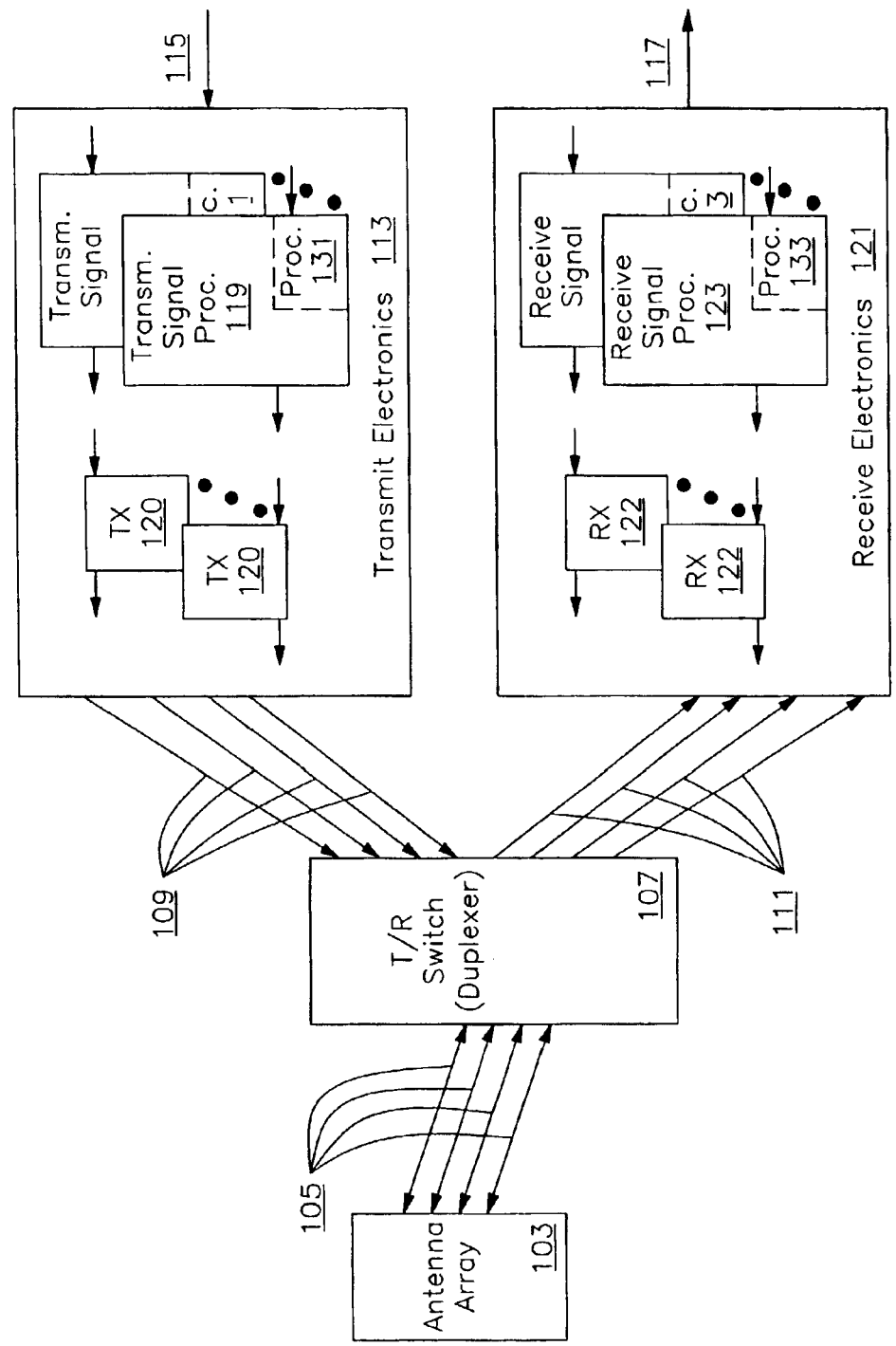
FIG. 4 is a functional block diagram of a multi-antenna transceiver system which includes elements suitable for implementing the method of the present invention.

Some embodiments of the present invention can be implemented in a communications receiver, such as, a Personal Handyphone System (PHS)-based antenna-array communication station (transceiver). An example of such a station is shown in FIG. 4, with M antenna elements in the antenna array. The PHS standard is defined by the Association of Radio Industries and Businesses (ARIB, Japan). Embodiments of the present invention can be implemented in, for example, low-mobility PHS systems, with M=4, and also for wireless local loop (WLL) systems, with more antenna elements, for example M=12. The present invention, while described in the context of PHS is in no way restricted to using the PHS air interface or to TDMA systems, but may be utilized as part of any communication receiver that includes adaptive smart antenna processing means, including CDMA systems using the IS-95 or WCDMA air interface and systems that use the common GSM air interface.

In the system of FIG. 4 a transmit/receive ("TR") switch 107 is connected between an M-antenna array 103 and both transmit electronics 113 (including one or more transmit signal processors 119 and M transmitters 120), and receive electronics 121 (including M receivers 122 and one or more receive signal processors 123). Switch 107 is used to selectively connect one or more elements of antenna array 103 to the transmit electronics 113 when in the transmit mode and to receive electronics 121 when in the receive mode. Two possible implementations of switch 107 are as a frequency duplexer in a frequency division duplex (FDD) system, and as a time switch in a time division duplex (TDD) system.

PHS uses TDD. The transmitters 120 and receivers 122 may be implemented using analog electronics, digital electronics, or a combination of the two. The receivers 122 generate digitized signals that are fed to a signal processor or processors 123. Signal processors 119 and 123 incorporate software or hardware and may be static (always the same processing stages), dynamic (changing processing depending on desired directivity), or smart (changing processing depending on received signals). Signal processors 119 and 123 may be the same DSP device or DSP devices with different programming for the reception and transmission, or different DSP devices, or different devices for some functions, and the same for others. Elements 131 and 133 perform downlink and uplink processing, respectively and include programming instructions for implementing the processing described with respect to FIGS. 1 and 2.

Note that while FIG. 4 shows a transceiver in which the same antenna elements are used for both reception and transmission, it should be clear that separate antennas for receiving and transmitting may also be used, and that antennas capable of only receiving or only transmitting or both receiving and transmitting may be used with adaptive smart antenna processing.

The PHS system is an 8 slot time division multiple access (TDMA) system with true time division duplex (TDD). Thus, the 8 timeslots can be divided into 4 transmit (TX) timeslots and 4 receive (RX) timeslots. This implies that for any particular channel, the receive frequency is the same as the transmit frequency. It also implies reciprocity, i.e., the propagation path for both the downlink (from base station to users' remote terminals) and the uplink (from users' remote terminals to base station) is identical, assuming minimal motion of the subscriber unit between receive timeslots and transmit timeslots. The frequency band of the PHS system used in the preferred embodiment is 1895–1918.1 MHz. Each of the 8 timeslots is 625 microseconds long. The PHS system includes a dedicated frequency and timeslot for a control channel on which call initialization takes place. Once a link is established, the call is handed to a service channel for regular communications. Communication occurs in any channel at the rate of 32 Kbits per second (Kbps), a rate termed the "full rate".

Also in PHS, a burst is defined as the finite duration RF signal that is transmitted or received over the air during a single timeslot. A group is defined as one set of 4 TX and 4 RX timeslots. A group always begins with the first TX timeslot, and its time duration is 8×0.625 milliseconds=5 milliseconds. The PHS system uses ($\pi7/4$ differential quaternary (or quadrature) phase shift keying ($\pi/4$ DQPSK) modulation for the baseband signal. The baud rate is 192 kilobaud. There are thus 192,000 symbols per second.

Figure 5:
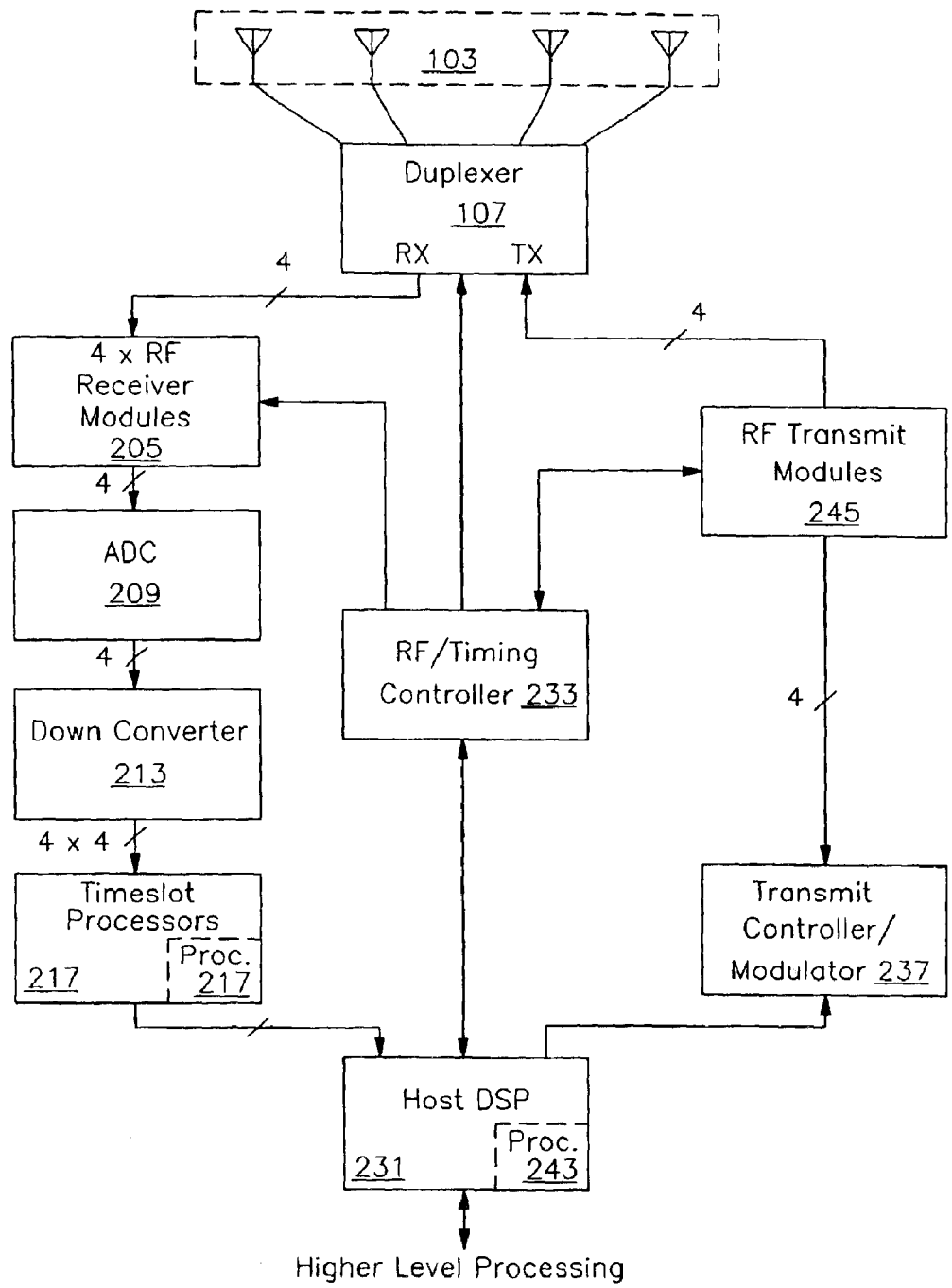
FIG. 5 is a more detailed block diagram of a transceiver that includes a signal processor capable of executing a set of instructions for implementing the method of the present invention.

FIG. 5 is a more detailed block diagram of a transceiver that includes a signal processor capable of executing a set of instructions for implementing embodiments of the present invention. This version of the FIG. 3 system is suitable for use in a low-mobility PHS system. In FIG. 3, a plurality of M antennas 103 are used, where M=4. More or fewer antenna elements may be used. The outputs of the antennas are connected to a duplexer switch 107, which in this TDD system is a time switch. When receiving, the antenna outputs are connected via switch 107 to a receiver 205, and are mixed down in analog by RF receiver modules 205 from the carrier frequency (around 1.9 GHz) to an intermediate frequency ("IF"). This signal is then digitized (sampled) by analog to digital converters ("ADCs") 209. The result is then down converted digitally by digital downconverter 213 to produce a four-times oversampled complex valued (in phase I and quadrature Q) sampled signal. Thus, elements 205, 209 and 213 correspond to elements that might be found in receiver 122 of FIG. 4. For each of the M receive timeslots, the M downconverted outputs from the M antennas are fed to a digital signal processor (DSP) device 217 (hereinafter "timeslot processor") for further processing. Commercial DSP devices can be used as timeslot processors, one per receive timeslot per spatial channel.

The timeslot processors 217 can perform several functions, which may include the following: received signal power monitoring, frequency offset estimation/correction and timing offset estimation/correction, smart antenna processing (including determining receive weights for each antenna element to determine a signal from a particular remote user and demodulation of the determined signal. The signal processing described above can be performed in each timeslot processor 217 in the embodiment of FIG. 5 is shown as block 241.

The output of the timeslot processor 217 is a demodulated data burst for each of the M receive timeslots. This data is sent to host DSP processor 231 whose main function is to control all elements of the system and interface with the higher level processing (i.e., processing which deals with what signals are required for communications in the different control and service communication channels defined in the PHS communication protocol). The host DSP 231 can be a commercial DSP device. The timeslot processors 217 can send the determined receive weights to host DSP 231. If desired, the receive weights may also be determined by software specifically implemented in host DSP 231.

RF controller 233 interfaces with the RF transmit elements, shown as block 245 and also produces a number of timing signals that are used by both the transmit elements and the modem. RF controller 233 receives its timing parameters and other settings for each burst from host DSP 231.

Transmit controller/modulator 237 receives transmit data from host DSP 231. Transmit controller 237 uses this data to produce analog IF outputs which are sent to RF transmitter (TX) modules 245. The specific operations performed by transmit controller/modulator 237 include: converting data bits into a complex valued ($\pi/4$ DQPSK) modulated signal; up-converting to an intermediate frequency (IF); weighting by complex valued transmit weights obtained from host DSP 231; and, converting the signals to be transmitted using digital to analog converters ("DACs") to form analog transmit waveforms which are provided to transmit modules 245.

While the signal processing operation described above can be performed by the host DSP 231, shown as block 243, in alternate versions, the downlink processing operations can be implemented in the timeslot processors 217 or in the transmit controller/modulator 237. Transmit modules 245 upconvert the signals to the transmission frequency and amplify the signals. The amplified transmission signal outputs are coupled to the M antennas 103 via duplexer/time switch 107.

User Terminal Structure

Figure 6:
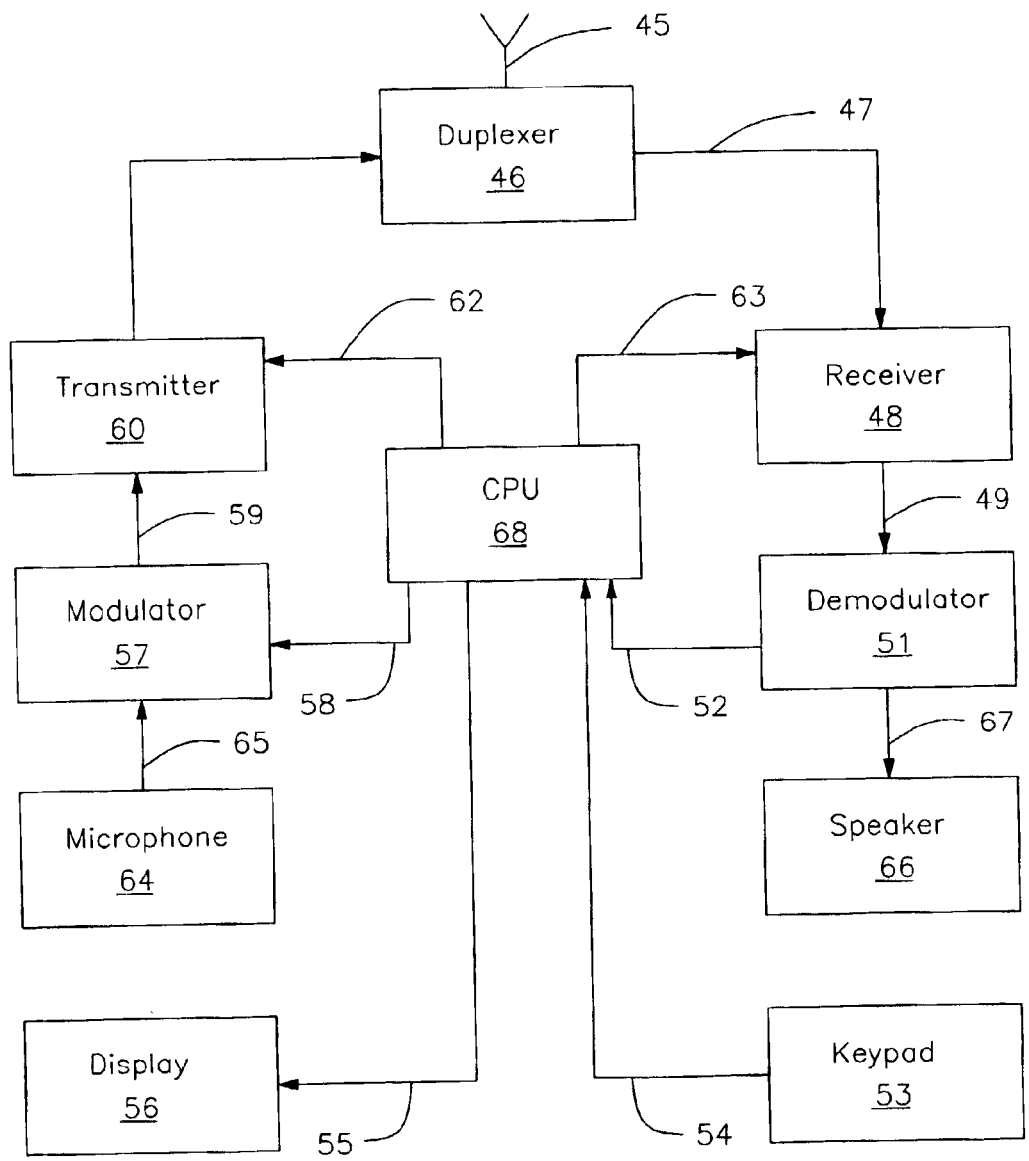
FIG. 6 is a block diagram of a remote terminal on which an embodiment of the invention can be implemented.

FIG. 6 depicts an example component arrangement in a remote terminal that provides data or voice communication. The remote terminal's antenna 45 is connected to a duplexer 46 to permit the antenna 45 to be used for both transmission and reception. The antenna can be omni-directional or directional. For optimal performance, the antenna can be made up of multiple elements and employ spatial processing as discussed above for the base station. In an alternate embodiment, separate receive and transmit antennas are used eliminating the need for the duplexer 46. In another alternate embodiment, where time division duplexing is used, a transmit/receive (TR) switch can be used instead of a duplexer as is well known in the art. The duplexer output 47 serves as input to a receiver 48. The receiver 48 produces a down-converted signal 49, which is the input to a demodulator 51. A demodulated received sound or voice signal 67 is input to a speaker 66.

The remote terminal has a corresponding transmit chain in which data or voice to be transmitted is modulated in a modulator 57. The modulated signal to be transmitted 59, output by the modulator 57, is up-converted and amplified by a transmitter 60, producing a transmitter output signal 61.

The transmitter output 61 is then input to the duplexer 46 for transmission by the antenna 45.

The demodulated received data 52 is supplied to a remote terminal central processing unit 68 (CPU) as is received data before demodulation 50. The remote terminal CPU 68 can be implemented with a standard DSP (digital signal processor) device such as a Motorola series 56300 Family DSP. This DSP can also perform the functions of the demodulator 51 and the modulator 57. The remote terminal CPU 68 controls the receiver through line 63, the transmitter through line 62, the demodulator through line 52 and the modulator through line 58. It also communicates with a keyboard 53 through line 54 and a display 56 through line 55. A microphone 64 and speaker 66 are connected through the modulator 57 and the demodulator 51 through lines 65 and 67, respectively for a voice communications remote terminal. In another embodiment, the microphone and speaker are also in direct communication with the CPU to provide voice or data communications. Furthermore remote terminal CPU 68 may also include a memory element to store data, instructions, and hopping functions or sequences. Alternatively, the remote terminal may have a separate memory element or have access to an auxiliary memory element.

In one embodiment, the speaker 66, and the microphone 64 are replaced or augmented by digital interfaces well-known in the art that allow data to be transmitted to and from an external data processing device (for example, a computer). In one embodiment, the remote terminal's CPU is coupled to a standard digital interface such as a PCMCIA interface to an external computer and the display, keyboard, microphone and speaker are a part of the external computer. The remote terminal's CPU 68 communicates with these components through the digital interface and the external computer's controller. For data only communications, the microphone and speaker can be deleted. For voice only communications, the keyboard and display can be deleted.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known circuits, structures, devices, and techniques have been shown in block diagram form or without detail in order not to obscure the understanding of this description.

The present invention includes various steps. The steps of the present invention may be performed by hardware components, such as those shown in FIGS. 4, 5 and 6, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, many of the steps described as being performed by the base station may be performed by the user terminal and vice versa. Furthermore, the invention is equally applicable to systems in which terminals communicate with each other without either one being designated as a base station, a user terminal, a remote terminal or a subscriber station. Thus, the present invention is equally applicable and useful in a peer-to-peer wireless network of communications devices using spatial processing. These devices may be cellular phones, PDA's, laptop computers, or any other wireless devices. Generally, since both the base stations and the terminals use radio waves, these communications devices of wireless communications networks may be generally referred to as radios.

In portions of the description above, only the base station is described as performing spatial processing using adaptive antenna arrays. However, the user terminals can also contain antenna arrays, and can also perform spatial processing both on receiving and transmitting (uplink and downlink) within the scope of the present invention.

Furthermore, in portions of the description above, certain functions performed by a base station could be coordinated across the network, to be performed cooperatively with a number of base stations. For example, each base station antenna array could be a part of a different base station. The base stations could share processing and transceiving functions. Alternatively, a central base station controller could perform many of the functions described above and use the antenna arrays of one or more base stations to transmit and receive signals.

The present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. A method comprising:
   measuring radio frequency signals received at different elements of an antenna system over time, the received signals corresponding at least in part to transmissions received from a system user;
   accumulating the signal measurements into a first matrix;
   generating a second matrix representing the transmissions of the system user;
   cross-correlating the first and second matrices to form a third matrix; and
   multiplying the third matrix with a product of the second matrix to form a fourth matrix in which the elements of the fourth matrix characterize the radio channel traversed by transmissions of the system user.

2. The method of claim 1, wherein generating a second matrix comprises generating the second matrix using estimates of the transmissions.

3. The method of claim 1, wherein generating a second matrix comprises generating the second matrix using known sequences stored in memory.

4. The method of claim 3, wherein generating a second matrix comprises generating the second matrix using known training sequences.

5. The method of claim 1, wherein the product of the second matrix comprises the inverse of the product of the second matrix multiplied by its transpose and complex conjugate.

6. The method of claim 1, wherein the elements of the fourth matrix comprise an estimated spatial signature for the system user.

7. The method of claim 1, further comprising using the elements of the fourth matrix as spatial signatures for the system user.

8. The method of claim 1, wherein accumulating the signal measurements comprises building a matrix with a row for each antenna element and a column for a time that each measurement is made.

9. The method of claim 8, wherein the received signals correspond at least in part to transmissions received from a plurality of system users and wherein generating a second matrix comprises building a matrix with a column for each user and a row corresponding to different samples of transmissions of each respective user.

10. The method of claim 9, wherein each column of the fourth matrix comprises an estimated spatial signature for one of the plurality of system users.

11. A machine-readable medium having stored thereon data representing instructions which, when executed by a machine, cause the machine to perform operations comprising:
   measuring radio frequency signals received at different elements of an antenna system over time, the received signals corresponding at least in part to transmissions received from a system user;
   accumulating the signal measurements into a first matrix;
   generating a second matrix representing the transmissions of the system user;
   cross-correlating the first and second matrices to form a third matrix; and
   multiplying the third matrix with a product of the second matrix to form a fourth matrix in which the elements of the fourth matrix characterize the radio channel traversed by transmissions of the system user.

12. The medium of claim 11, wherein the instructions for generating a second matrix comprise instructions which, when executed by the machine, cause the machine to perform further operations comprising generating the second matrix using estimates of the transmissions.

13. The medium of claim 11, wherein the instructions for generating a second matrix comprise instructions which, when executed by the machine, cause the machine to perform further operations comprising generating the second matrix using known sequences stored in memory.

14. The medium of claim 13, wherein the instructions for generating a second matrix comprise instructions which, when executed by the machine, cause the machine to perform further operations comprising generating the second matrix using known training sequences.

15. The medium of claim 11, wherein the product of the second matrix comprises the inverse of the product of the second matrix multiplied by its transpose and complex conjugate.

16. The medium of claim 11, further comprising instructions which, when executed by the machine, cause the machine to perform further operations comprising using the elements of the fourth matrix as spatial signatures for the system user.

17. The medium of claim 11, wherein the instructions for accumulating the signal measurements comprise instructions which, when executed by the machine, cause the machine to perform further operations comprising building a matrix with a row for each antenna element and a column for a time that each measurement is made.

18. The medium of claim 17, wherein the received signals correspond at least in part to transmissions received from a plurality of system users and wherein the instructions for generating a second matrix comprise instructions which, when executed by the machine, cause the machine to perform further operations comprising building a matrix with a column for each user and a row corresponding to different samples of transmissions of each respective user.

19. An apparatus comprising:
   a receiver coupled to different elements of an antenna system;
   a sampler coupled to the receiver to measure radio frequency signals received at the different elements of the antenna system over time, the received signals corresponding at least in part to transmissions received from a system user; and
   a signal processor to accumulate the signal measurements into a first matrix, generate a second matrix representing the transmissions of the system user, cross-correlate the first and second matrices to form a third matrix, and multiply the third matrix with a product of the second matrix to form a fourth matrix in which the elements of the fourth matrix characterize the radio channel traversed by transmissions of the system user.

20. The apparatus of claim 19, wherein the signal processor generates the second matrix using estimates of the transmissions.

21. The apparatus of claim 19, further comprising a memory and wherein the signal processor generates the second matrix using known sequences stored in the memory.

22. The apparatus of claim 19, wherein the product of the second matrix comprises the inverse of the product of the second matrix multiplied by its transpose and complex conjugate.

23. The apparatus of claim 19, further comprising a transmitter to transmit signals to the system user using the elements of the fourth matrix as spatial signatures for the system user.

* * * * *